R. H. McLAIN.
CONTROL OF INDUCTION MOTORS.
APPLICATION FILED NOV. 21, 1917.
1,347,751.
Patented July 27, 1920.
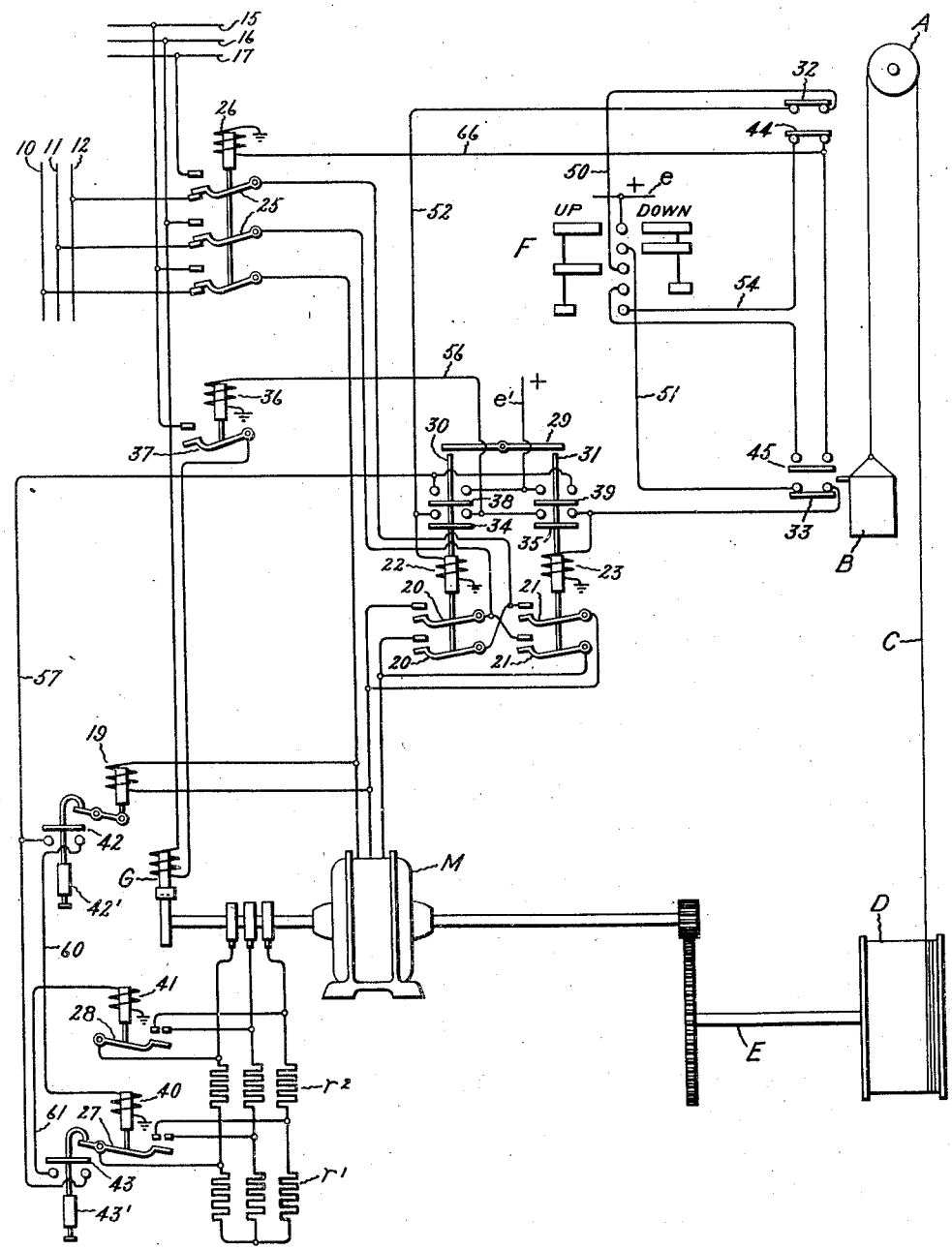
Inventor:
Robert H. McLain,
by [signature]
His Attorney.

UNITED STATES PATENT OFFICE.

ROBERT H. McLAIN, OF SCHENECTADY, NEW YORK, ASSIGNOR TO GENERAL ELECTRIC COMPANY, A CORPORATION OF NEW YORK.

CONTROL OF INDUCTION-MOTORS.

1,347,751.  Specification of Letters Patent.   Patented July 27, 1920.

Application filed November 21, 1917. Serial No. 203,245.

*To all whom it may concern:*

Be it known that I, ROBERT H. MCLAIN, a citizen of the United States, residing at Schenectady, in the county of Schenectady, State of New York, have invented certain new and useful Improvements in Control of Induction-Motors, of which the following is a specification.

This invention relates to the control of alternating current motors of the induction type and has for its object the provision of means for simply and efficiently changing the motor speed.

More specifically, this invention is designed to provide means for enabling an induction motor to run with a plurality of speeds.

By reason of the extensive use of alternating currents and by reason of its general simplicity, the use of induction motors for power purposes is very desirable. Its most conspicuous limitation, however, is the lack of convenient speed regulation.

Induction motors capable of being operated at a plurality of speeds known as the multi-speed type have been devised, in which a plurality of field windings are used arranged to give different numbers of poles together with switch gear for changing from one winding to another. In such arrangements much of the original simplicity of the induction motor is sacrificed along with the consequent inefficient use of copper in the windings.

The switch gear for effecting these changes is also bulky and becomes inconvenient where space must be considered, as for instance in elevator service.

In carrying my invention into effect, I have overcome these difficulties by employing an induction motor with a constant or but a small range of speed and providing a plurality of sources of power therefor having different frequencies and appropriate switch gear as the means for connecting the motor to these sources as changes in speed are desired.

An induction motor having its speed controlled in this manner has an advantage over a direct current motor since commutator troubles are absent and because it runs at low speeds with constant angular velocity without creeping and operates with substantially the same losses on low speeds as on high speeds whereas a direct current motor consumes power, at the low speeds, in the regulating resistance which reduces the over all efficiency.

In installations which would require a rotary converter to supply the direct current motors or a frequency changer to supply the second source of current for induction motors controlled in accordance with my invention; the latter would still have the advantage over the former, in case of the failure of either the rotary converter or frequency changer, in that the direct current motor would have to be shut down whereas the induction motor could still be operated in some manner from the original source of alternating current.

My invention may be applied with advantage in the operation of elevators and hoists, such as skip hoists and tipples, which require a plurality of operating speeds and where space for switch gear must be considered; especially where it is desired to have a low or creeping speed in order to avoid spilling material at the start and when traveling at high speed to have this speed stepped down automatically as the cage approaches its limits of travel in order to effect an accurate stop.

In carrying out this phase of my invention I have accordingly provided cage operated switches along the path of travel for operating the switch gear changing from one source of power to another as changes in speed are desired.

For a more complete understanding of the nature and objects of this invention reference should be had to the following detailed description taken in connection with the accompanying drawings which show an embodiment thereof in diagrammatic fashion as applied to the operation of a hoist or cage.

Referring now to the drawing, B represents a car or cage having a limited path of travel, attached to the cable C which is shown as passing over the head sheave A. The cable C is arranged to be wound upon drum D mounted on the shaft E which is geared to the induction motor M.

The motor M is supplied with electric power for rotating the drum D from the two sets of mains 10, 11, 12 and 15, 16, 17, each set having a different frequency; for instance the set 10, 11 and 12 may be arranged to supply power at a frequency of 15 cycles while the set 15, 16 and 17 would supply power at a frequency of 60 cycles the voltage of the two sources being in substantially the same ratio as their frequencies.

The starting, stopping and reversing of the motor M is controlled by the line switches 20 and 21 in the motor circuit, which are actuated respectively by the electromagnetic windings 22 and 23 energized and deënergized by the master switch or controller F.

The connections for the motor circuit are shifted from one set of supply mains to the other by means of the double throw switch 25 which is also actuated by an electromagnetic winding 26 under the control of both the controller F and the position of the cage B in a manner to be presently described.

The motor M is provided with an ordinary electromagnetic brake G and an automatic starting device here shown as consisting of two sets of non-inductive resistance $r_1$ and $r_2$ connected in series with the rotor winding and arranged to be cut out successively by the contactors 27 and 28 respectively.

The switches 20 and 21 for making and breaking the line connections to the motor M are shown as mechanically interlocked by means of the pivoted bar 29 coöperating with the ends of plungers 30 and 31 in a manner to prevent the closing of one switch until the other is opened.

The winding 22 of the switch 20 is connected in a control circuit to be energized by the controller F from a source of electric energy indicated at e when the circuit is closed by the left hand contacts of the controller, there being also a cage operated switch 32 in series with the controller in this circuit.

The winding 23 of the switch 21 is likewise connected to be energized by the controller F from source e when the circuit is closed by the right hand contacts of the controller, there being also a cage operated switch 33 in series with the controller when in this position.

Each switch 20 and 21 is provided with an auxiliary switch, indicated at 34 and 35 respectively, arranged to close a circuit in parallel with its electromagnetic winding when it has closed the motor circuit, for energizing the electromagnetic winding 36 which actuates the contactor 37. The contactor 37 controls the circuit of the brake G and is arranged to release it when the motor circuit is closed.

Each switch 20 and 21 is also provided with a second auxiliary switch, indicated at 38 and 39 respectively for closing another control circuit having therein electromagnetic windings 40 and 41 connected in parallel for actuating contactors 27 and 28 respectively when energized.

The windings 40 and 41, however are not energized the instant that auxiliary switch 38 or 39 closes this second control circuit by reason of the switches 42 and 43 in series with windings 40 and 41 respectively. The switch 42 is biased to open position and is provided with a retarding device 42' here shown as a dash pot, in order that the switch 42 will be closed after the lapse of a definite time interval by electromagnetic winding 19 when energized, the winding being placed across one side of the motor circuit between the motor M and the switches 20 and 21. The switch 43 is likewise biased to open position and is provided with a retarding device or dash pot 43' to be closed after the lapse of a definite time interval by electromagnetic winding 40 when energized.

The double throw switch 25 is biased to normally connect the motor circuits to the mains 10, 11 and 12 which supply electric energy at a lower frequency than the mains 15, 16 and 17. The controller F when turned from neutral to either the first left hand or right hand position operates the motor at the slow speed.

Should the controller F be moved to either its second left or right hand position the electromagnetic winding 26 is energized from source e having either the cage operated switch 44 or 45 in series therewith according to the position of controller F.

When winding 26 is energized, switch 25 is moved to connect the motor circuits to the high frequency mains 15, 16 and 17, which causes the motor M to accelerate to high speed.

The cage operated switches 32, 44, 33 and 45 are placed along the path of travel of the cage, near the upper and lower limits thereof as shown. The switches 32 and 44 are so arranged near the upper limit of travel that they are opened as the cage goes up past them and remain open until the cage passes them on its downward movement; the switches 33 and 45 being similarly placed near the lower limit of travel but opened by a downward movement of the cage, remaining open until closed by an upward movement.

The switches 44 and 45 which control the energization of winding 26, and consequently the operation of motor M at high speed, are so placed that they are opened before switches 32 and 33 as the cage approaches its limits of travel so that the cage is automatically decelerated before it opens either of the switches 32 and 33, which are in series with the windings 22 and 23.

The operation of this invention is as follows:

Assuming that the cage B is at rest in the position shown and that moving the controller F to make contact on the left causes the motor M to hoist the cage, contact on the right causing the motor to lower the cage; in order to start the cage moving upward at slow speed, the controller would be moved to its first left hand position. Current would then flow from source $e$ through the controller contacts to conductor 50, thence to switch 32, thence to conductor 52 to energize winding 22 and thence to ground. Winding 22 when energized closes switch 20 completing the motor circuits from the mains 10, 11 and 12 since switch 25 is normally biased to be connected with these mains.

When switch 20 is closed, auxiliary switch 34 is closed thereby, so that current flows from conductor 52 in parallel with winding 22, through switch 34 to conductor 56, to energize winding 36 and thence to ground. Winding 36 when energized closes contactor 37 completing a circuit across a pair of electric supply mains through the winding of the brake G so that it is released permitting the rotor of the motor M to start revolving with both sets of resistance $r_1$ and $r_2$ in series with the rotor winding.

As soon as switch 20 is closed, the winding 19, which is connected across one side of the motor circuit, is energized and closes switch 42 against the action of the retarding device 42', the secondary motor current flowing in the sets of resistance $r_1$ and $r_2$ having decreased to a safe value.

When switch 42 closes, current flows from source $e'$ through switch 38, which was closed by the closing of switch 20, to conductor 57, thence to switch 42, thence to conductor 60 to energize winding 40 and thence to ground.

When winding 40 is energized the contactor 27 closes, cutting out resistance $r_1$ from the rotor circuit. Switch 43 now closes against the action of retarding device 43' after winding 40 has been energized; hence current flows from conductor 57 in parallel with switch 42, through switch 43 through conductor 61 to energize winding 41 and thence to ground.

When winding 41 is energized the contactor 28 closes cutting out resistance $r_2$ from the rotor circuit after the lapse of a predetermined interval of time since the resistance $r_1$ has been cut out, thereby enabling the motor M to attain its normal speed corresponding to the low frequency of mains 10, 11 and 12 with which it is first connected.

Should it now be desired to have the cage B hoisted at high speed, the controller F is moved to its second left hand position so that current now also flows from source $e$ through the controller contacts to conductor 54, through the switch 44, thence to conductor 66 to energize winding 26 and thence to ground. Winding 26 when energized throws switch 25 to connect the motor circuits to the high frequency mains 15, 16 and 17 whereby the motor is enabled to accelerate to its normal high speed.

This acceleration is accomplished automatically in the same manner that the acceleration to normal low speed is accomplished for, when switch 25 is shifted to make connections with the high frequency mains, the motor M is momentarily out of connection with any source of electric power so that winding 19 is deënergized and contactors 27 and 28 thereby opened. When switch 25 is finally thrown to connect with the high frequency mains winding 19 is again energized so that contactors 27 and 28 are successively closed cutting the sets of resistance $r_1$ and $r_2$ out of the rotor circuit after the lapse of predetermined intervals of time thus gradually accelerating the motor to its normal high speed.

Assuming now that the cage B, which is being hoisted, is approaching its upper limit of travel; it will first open switch 44 thereby deënergizing winding 26 so that the motor M is automatically decelerated by being thrown on to the low frequency mains, switches 27 and 28 first opening then closing again automatically.

When the cage has reached its upper limit of travel it will open switch 32 thereby deenergizing windings 22 and 36. The switch 20 is consequently opened and the brake G applied, whereby the motor is brought to a stop.

By moving the controller F to its first right hand then to its second right hand position, the cage B would be started on its downward journey first at low speed then at high speed by first connecting the motor to mains 10, 11, and 12 through switch 21 and then to mains 15, 16 and 17 when winding 26 has been energized, all substantially similar to the manner described above in connection with the hoisting movement.

As the cage B approaches the lower limit of travel, the switch 45 would first be opened to deënergize winding 26 connecting the motor to the low frequency mains and thereby decelerating it, then switch 33 would be opened, to open switch 21 and to apply the brake G thereby stopping the motor.

The automatic starting device above described is no part of my present invention and any other known type could be used instead.

The arrangement shown of the cage operated switches 32, 44, 33 and 45 along the path of the cage is by no means the only operative arrangement, I may arrange them so as to not only decelerate the cage but to accelerate the cage when desired points are reached.

While I have here shown an embodiment of my invention which is, at present, the best means known to me for carrying the same into effect, I would have it understood that this is merely illustrative and that I do not mean to be limited thereby to the precise details here disclosed since obvious alterations thereof will appear to those skilled in this art, nor in the choice of recognized equivalents except as defined in my claims hereunto annexed.

What I claim as new and desire to secure by Letters Patent of the United States, is:

1. The combination with an induction motor, of a plurality of sources of electrical supply, each having a different frequency, the voltages of the sources being in substantially the same ratio as their frequencies, line switches for making and breaking the motor connections to any one of said sources for both directions of rotation, a switch for shifting the motor connections from one source to another said shifting switch being biased for normally making connections with the low frequency source and means for closing said line switches to start said motor at low speed and for throwing said shifting switch to accelerate said motor to a higher speed.

2. The combination with an induction motor, of a plurality of sources of electrical supply, each having a different frequency, the voltages of the sources being in substantially the same ratio as their frequencies, line switches for making and breaking the motor connections to any one of said sources for both directions of rotation, a switch for shifting the motor connections from one source to another, said shifting switch being biased for normally making connections with the low frequency source and a master switch having separate positions for actuating said line switches and said shifting switch.

3. The combination with an induction motor, of a plurality of sources of electrical supply, each having a different frequency, the voltages of the sources being in substantially the same ratio as their frequencies, a cage having a limited path of travel moved by said motor, line switches for making and breaking the motor connections to any one of said sources, a switch for shifting the motor connections from one source to another, switches placed along the path of travel of said cage arranged to be actuated by the movements thereof and a master switch coöperating with said cage actuated switches to operate said line and shifting switches.

4. The combination with an induction motor, of a plurality of sources of electrical supply, each having a different frequency, the voltage of the sources being in substantially the same ratio as their frequencies, a cage having a limited path of travel moved by said motor, line switches for making and breaking the motor connections to any one of said sources, a switch for shifting the motor connections from one source to another, cage actuated switches placed adjacent the limits of said path of travel and arranged to operate said line and shifting switches for automatically decelerating and stopping said cage and a master switch also arranged to operate said line and shifting switches as desired.

5. The combination with an induction motor, of a plurality of sources of electrical supply, each having a different frequency, the voltage of the sources being in substantially the same ratio as their frequencies, a cage having a limited path of travel moved by said motor, line switches for making and breaking the motor connections to any one of said sources, a switch for shifting the motor connections from one source to another, electromagnetic windings for operating each of said line and shifting switches, cage actuated switches placed at the limits of said path, in series with said line switch windings, other cage actuated switches placed near the limits of said path in series with said shifting switch winding, and a master switch arranged to energize and deënergize said windings as desired.

6. The combination with an induction motor, of a plurality of sources of electrical supply, each having a different frequency, a cage having a limited path of travel moved by said motor, line switches for making and breaking the motor connections to any one of said sources, a switch for shifting the motor connections from one source to another, control circuits including electromagnetic windings for operating each of said line and shifting switches, a master switch for energizing and deënergizing said circuits as desired, an electromagnetic brake for said motor arranged to be released by the closing of said line switches, an automatic starting device for said motor also actuated by the closing of said line switches, cage actuated switches placed at the limits of travel of said cage in series with said line switch windings and other cage actuated switches placed near said limits in series with said shifting switch windings.

In witness whereof, I have hereunto set my hand this 20th day of November, 1917

ROBERT H. McLAIN.